(12) United States Patent
Denvir et al.

(10) Patent No.: US 6,169,648 B1
(45) Date of Patent: Jan. 2, 2001

(54) ELECTRONIC MOTOR PROTECTION SYSTEM

(75) Inventors: Kerry J. Denvir, Attleboro, MA (US); Joseph G. Nield, Jr., North Smithfield, RI (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/289,509

(22) Filed: Apr. 9, 1999

(51) Int. Cl.[7] .................................................. H02H 5/00
(52) U.S. Cl. .............................. 361/25; 361/27; 361/103; 361/106
(58) Field of Search ........................... 361/25, 103, 93.1, 361/105, 106, 104, 27

(56) References Cited

U.S. PATENT DOCUMENTS

| | | | |
|---|---|---|---|
| 4,281,358 | 7/1981 | Plouffe et al. | 361/22 |
| 5,548,464 | 8/1996 | Manning | 361/23 |

*Primary Examiner*—Stephen W. Jackson
(74) *Attorney, Agent, or Firm*—Russell E. Baumann; Frederick J. Telecky, Jr.

(57) ABSTRACT

An electronic motor protection system which protects electric motors against various fault conditions such as over-temperature (12) of the individual windings of the motor and low voltage (18, 20). The system has a power supply compatible with 24, 120 or 240 VAC input voltage using only two input terminals. According to a first embodiment, line voltage is inputted to a transformer (T1) while the combination of a zener follower (Z1, Z2, Q1) and series regulator (U1, Q2, Q3) provide independent DC voltage supply levels or voltage rails (VR1, VR2) for control circuitry over a wide range of input voltages. A dead-band voltage range is provided by a circuit section (20) which works in conjunction with a 240 volt, low voltage cut-out circuit section (18) to prevent the possibility of chatter in 240V motors and excessive voltage from being applied to 120 volt motors. The motor is protected by means of an output relay (K) being de-energized upon detection of a fault condition which energizes an adjustment circuit (22) to stabilize the load seen by the power supply transformer. According to a second embodiment input voltage level is detected by comparator circuitry (U4A) in the secondary side of a transformer (T2) which switches contacts of a double pole, double throw relay K1 to switch first and second primary transformer windings (TP1, TP2) from a parallel configuration when exposed to 120 VAC to a series configuration when exposed to 240 VAC.

11 Claims, 4 Drawing Sheets

ELECTRONIC MOTOR PROTECTION SYSTEM

FIELD OF THE INVENTION

This invention relates generally to electric motors and more particularly to systems for protecting such motors from adverse conditions such as over-temperature of the windings.

BACKGROUND OF THE INVENTION

Electronic motor protection systems have been in wide use for a number of years. Typically, such systems have temperature sensors, such as positive temperature coefficient of resistivity (PTC) thermistors embedded in the windings of a motor to be protected with the thermistors electrically connected to a circuit which is arranged to de-energize the motor whenever a winding heats up to a selected level, occasioned by overcurrent or the like, thereby causing the PTC thermistors to go into a high resistance state. A system of this type is the subject of U.S. Pat. No. 4,281,358, assigned to the assignee of the instant invention. This system employs a transformer for an isolated power supply with different transformers used for different input voltage levels such as 115 and 240 volts. Subsequently a new electronic circuit, the subject of U.S. Pat. No. 5,585,990 also assigned to the assignee of the present invention, was developed which employs an integrated power supply in which an integrated circuit reduces the voltage to a selected level, e.g., 24 volts, providing a lower cost circuit, however, in some applications, particularly in some parts of the world where step down transformers to attenuate line voltage are not used and where power is connected across a phase to neutral, the IC power supply is vulnerable to transients, electrical noise and the like thereby resulting in premature failure in some cases.

SUMMARY OF THE INVENTION

It is an object of the invention to provide an improved motor protection system which is low in cost yet robust in design, one in which the temperature sensors are electrically isolated from line voltage and one in which there is greater commonality in parts among all voltage ratings, without the need for jumpers or additional circuit connections.

Briefly, in accordance with the invention, an electronic motor protection system employs temperature responsive thermistors, i.e., sensors, which are adapted to be embedded into respective windings of a motor. An electrical signal is fed from the sensors to a comparator circuit which controls the energization of a transistor switch serially connected to the coil of a low current relay which in turn controls the energization of a contactor which switches current to the motor being protected. According to a feature of the invention, a transformer is used to provide an isolated power supply which is compatible with either 120 or 240 VAC input voltage. In one embodiment, line voltage is inputted to a transformer and the combination of a zener follower network and a series regulation network are used to simultaneously provide independent DC voltage supply levels for control circuitry, thereby allowing for logic operation and voltage detection over a wide range of input AC voltage. According to a second embodiment, line voltage is input to a dual-primary transformer whose coil orientation is controlled by a double pole, double throw relay which switches the primary from a 240 volt series connection to a parallel connection when exposed to 120 VAC line input. The relay is controlled on the secondary side of the transformer by a comparator circuit. On the secondary side, after the transformer, a full wave bridge is followed by a simple regulation arrangement, such as a zener follower regulation network, to provide DC voltage to the logic circuitry. According to a feature of the invention, the protection system includes comparator circuits to detect whenever the AC input voltage drops a selected amount below nominal and thereupon turn off the output relay. According to another feature, a dead-band voltage range is provided between the 120 and 240 VAC modes of operation so that when in the dead-band voltage range the output relay contacts will not close to thereby prevent the possibility of excessive voltage being applied to 120 volt motors. According to yet another feature of the invention, an adjustment circuit is provided to compensate for the change in load conditions whenever the output relay is de-energized to thereby stabilize current in the circuit.

Additional objects and advantages of the invention will be set forth in part in the description which follows and in part will be obvious from the description. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principles of the invention. In the drawings.

DETAILED DESCRIPTION OF THE PREFERRED EMBODIMENTS

Figure 1A:
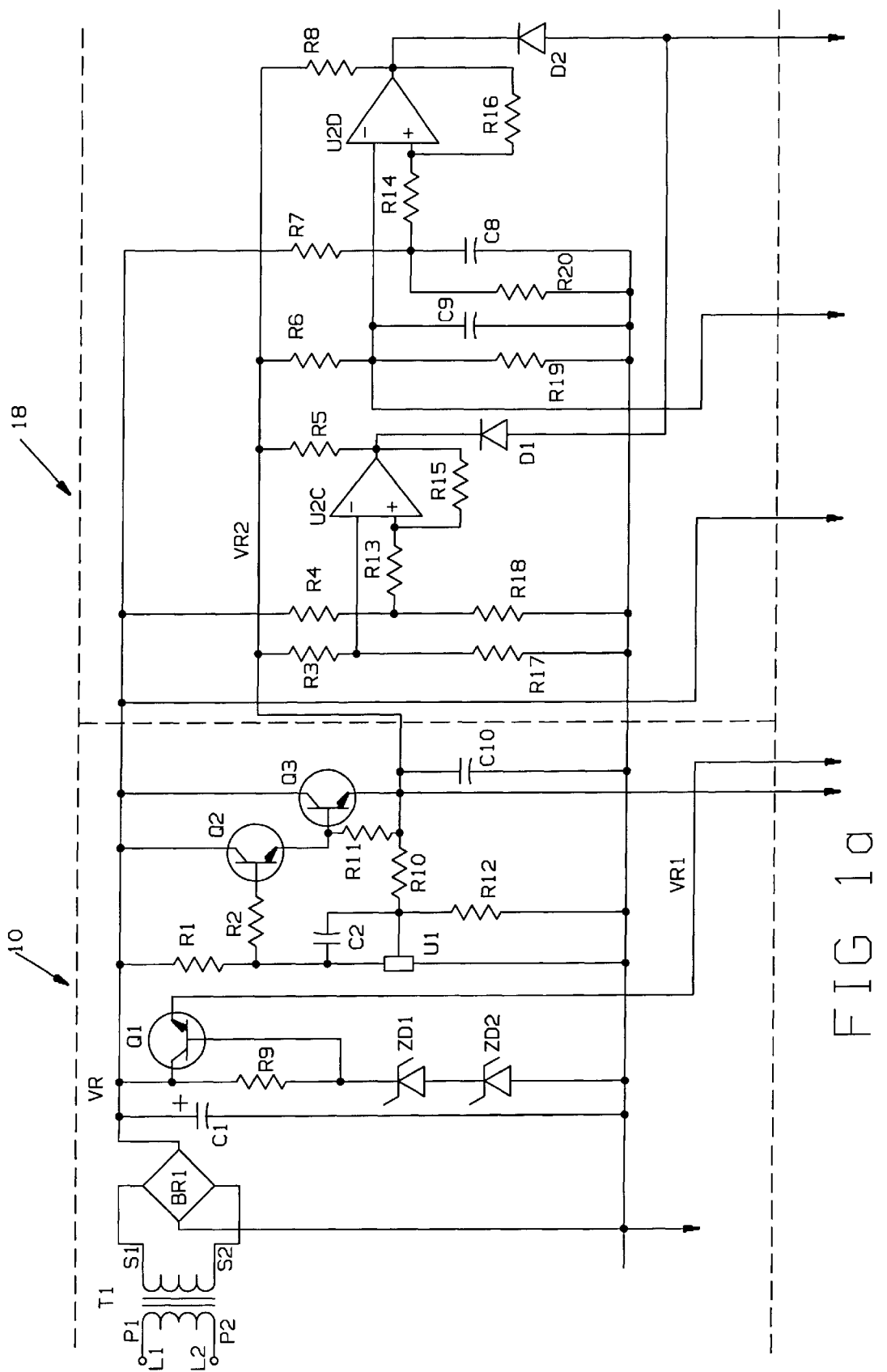
FIG. 1 is an electrical schematic of an electronic motor protection system made in accordance with a first embodiment of the invention.
Figure 1B:
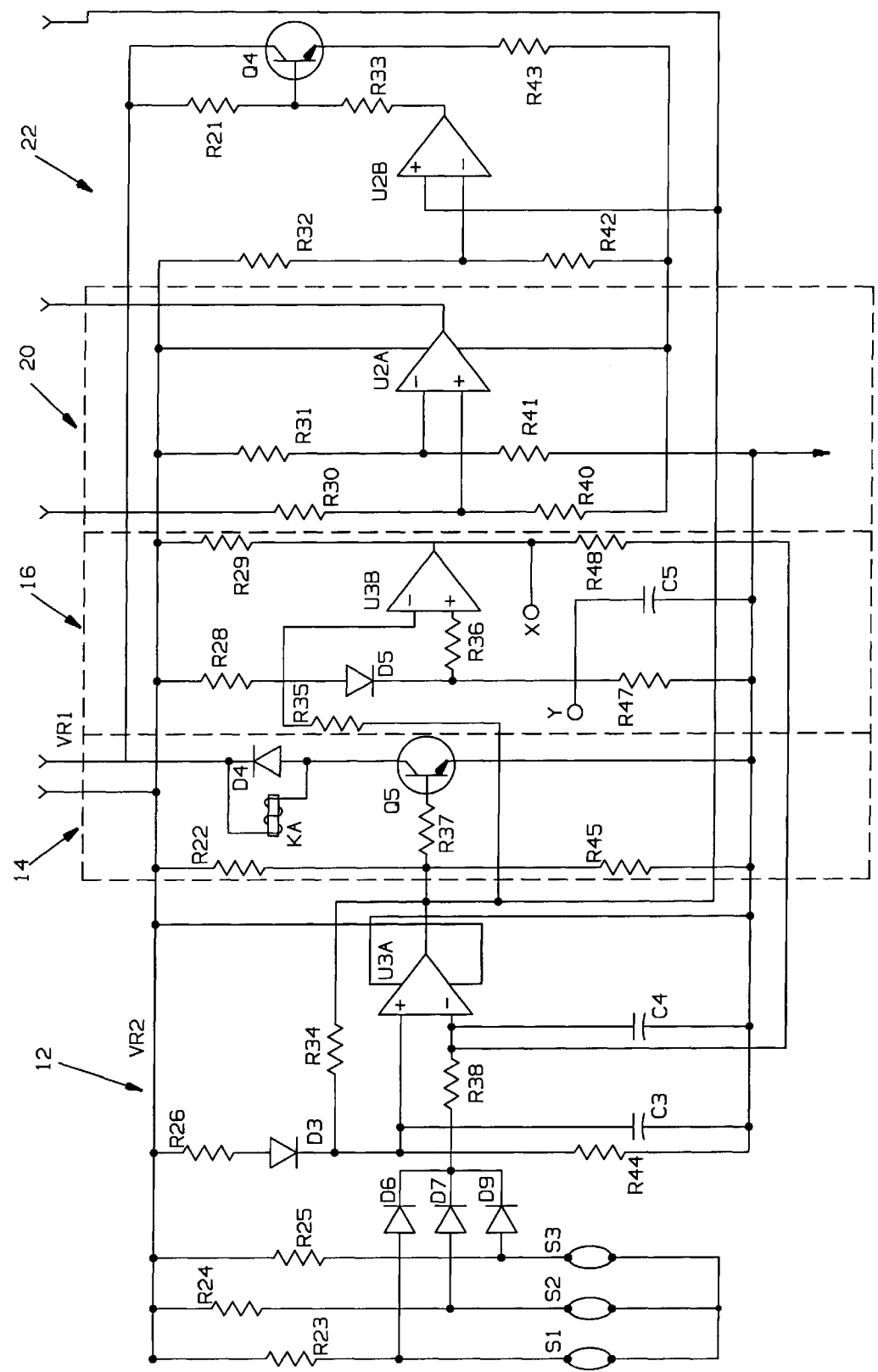

With reference to FIG. 1, a power supply section 10 comprises a transformer T1 connected to AC line voltage through terminals L1, L2. Transformer T1 steps down the voltage approximately 5 or 6:1, depending upon input voltage, current and temperature, although other ratios could be provided, if desired. The secondary of transformer T1 is connected to a full-wave bridge BR1 which is followed by filter capacitor C1 to provide a ripple voltage line VR which is directly proportional to line voltage. A first voltage rail VR1 is provided by a zener follower circuit comprising serially connected zener diodes ZD1, ZD2 connected to resistor R9 across line VR and ground. An NPN transistor Q1 has its base connected between resistor R9 and zener diode ZD1 and its collector connected to line VR so that its emitter provides approximately a 10, 12 volt rail VR1 to power the coil KA of the output relay to be discussed below. A second voltage rail VR2 is provided by a precision voltage reference U1 such as TL4311, available from Texas Instruments Incorporated. Regulator U1 provides a stable, relatively temperature independent output. Reference U1 is serially connected to resistor R1 across line VR and ground. A capacitor C2 is coupled between the input and output of U1. A bias resistor R2 is connected between the junction of resistor R1 and U1 and the base of NPN transistor Q2 whose collector is connected to line VR and emitter is in turn connected to the base of NPN transistor Q3. A resistor R11 is connected to the base of transistor Q3 and to the output of U1 through resistor R10. The input of series regulator U1 is connected to ground through resistor R12. Resistor R11 is also coupled to the emitter of transistor Q3 providing voltage rail VR2 of 8 volts for control voltage. Capacitor C10 is connected between line VR2 and ground.

Over-temperature protection section 12 comprises temperature responsive sensors in the form of PTC thermistors S1, S2, S3 which are adapted to be embedded in respective windings of a motor to be protected. The sensors are connected externally of the protection system and form voltage dividers with resistors R23, R24, R25, respectively, between voltage rail VR2 and common. The junction of each voltage divider is connected through a respective diode D6, D7 and D9, and through an attenuating resistor R38 to the negative input of a comparator U3A, connected to provide a selected hysteresis. A reference voltage is connected to the non-inverting input through voltage dividers comprising resistors R44, R26 along with diode D3 connected between voltage rail VR2 and ground. Feedback resistor R34 is connected between the output of the comparator, the non-inverting input and the cathode of diode D3. Filter capacitors C3 and C4 are respectively connected between the inputs of the comparator and ground.

The output section 14 comprises an NPN transistor Q5 whose base is connected, through resistor R37, to the output of comparator U3A. The collector of transistor Q5 is connected to coil KA of a 12 volt relay with diode D4 coupled across the coil. Power is supplied from voltage rail VR1 with the emitter of transistor Q5 connected to ground. Thus, when a winding of the motor gets too hot the respective PTC sensor will abruptly increase in resistance from a nominal low level to 10 K ohms or higher which will drive the output of comparator U3A to ground thereby turning off transistor Q5 and in turn preventing the flow of current in coil KA. This opens the contacts of the relay (not shown), in turn de-energizing the contactor (not shown) and the motor being protected.

A time delay section 16 is provided to allow the motor to cool off. Time delay section 16 comprises a comparator U3B whose inverting input is connected through resistor R35 to the output of over-temperature comparator U3A. The non-inverting input of time delay comparator U3B is connected to an RC circuit comprising capacitor C5 and resistor R47 through resistor R36. The junction of the RC circuit and resistor R36 is connected to the cathode of diode D5 which in turn is connected through resistor R28 to voltage rail VR2. The output of time delay comparator U3B is connected to the junction of serially connected resistors R29 and R48 which in turn are connected between voltage rail VR2 and the inverting input of over-temperature comparator U3A. The output of comparator U3B is driven high whenever the output of over-temperature comparator U3A is low thereby maintaining the relay off until the voltage on the time delay capacitor C5 decreases below a selected level at which point the time delay comparator U3B is output is driven low. After the time delay, the over-temperature protection comparator U3A output will be driven high and the relay contacts will close only if fault conditions are no longer present, as will be discussed in further detail below.

Low voltage cut-out section 18 comprises first and second comparators U2C, U2D. Comparator U2C detects low voltage on the voltage ripple line VR for 120 volt applications at approximately 70% below nominal, i.e., approximately the equivalent of 84 volts. Reference voltage is provided by a voltage divider comprising resistors R17, R3 connected between voltage rail VR2 and ground, inputted to the inverting input of comparator U2C. The non-inverting input is connected through resistor R13 to the junction of voltage divider resistors R18, R4 connected between voltage ripple line VR and ground. The output of comparator U2C is tied to its non-inverting input through feedback resistor R15 to provide hysteresis and to voltage rail VR2 through resistor R5. The output of comparator U2C is connected to the cathode of diode Di which in turn connected to the output of over-temperature protection comparator U3A.

Similarly, comparator U2D detects low voltage on the voltage ripple line VR for 240 volt applications at approximately 70% below nominal, i.e., the equivalent of approximately 168 volts. Reference voltage is provided by a voltage divider comprising resistors R19, R6 connected between voltage rail VR2 and ground and whose junction is connected to the inverting input of comparator U2D. The non-inverting input is connected through resistor R14 to the junction of voltage divider resistors R20, R7 connected between ripple voltage line VR and ground. Hysteresis is provided by feedback resistor R16 connected between the output of comparator U2d and the non-inverting input. The output of comparator U2D is tied to voltage rail VR2 through resistor R8 and to the output of over-temperature protection comparator U3A through diode D2 with the cathode of diode D2 connected to the output of comparator U2D. A filter capacitor C9 is connected between the inverting input of comparator U2D and ground and filter capacitor C8 is connected between the junction of resistors R20, R7 and ground.

The output of comparators U2C, U2D are driven to ground when low voltage is detected which in turn grounds the output of over-temperature protection comparator U3A thereby turning off the relay.

Working in conjunction with low voltage cut-out section 18 is line voltage cut-out selector section 20 which provides a dead-band between selected voltages of approximately 150 and 170 VAC input. Section 20 comprises a comparator switch U2A. The detection voltage is provided by the junction of voltage divider resistors R40, R30 connected between ripple voltage line VR and ground, the junction being tied to the non-inverting input. A reference voltage, connected to the inverting input, is provided at the junction of voltage divider resistors R41, R31 connected between voltage rail VR2 and ground. The comparator serves as a switch with no hysteresis and has its output connected to the junction of voltage divider resistors R19, R6, which provide the reference voltage for comparator U2D. The output of comparator U2A is maintained low as long as voltages equivalent to under approximately 155 VAC are detected. A low output state results in the junction of resistors R19, R6 being connected to ground causing the reference voltage for comparator U2D to be 0 volts, and maintaining the output of U2D high. When voltages are detected above approximately 155 VAC, comparator U2A switches its output to high, thereby increasing the reference voltage to its intended value and allowing comparator U2D to perform its function, which is to detect voltages less than a selected level, e.g., 168 VAC, and to cause the relay contacts to open. Thus the two comparator stages, U2A and U2D, work in conjunction such that between approximately 155 VAC and 168 VAC the contacts of the output relay will never close. This prevents the possibility of chatter in 240 volt motors as well as excessive voltage being applied to 120 volt motors.

Adjustment circuit for relay drop-out section 22 comprises comparator U2B having a reference voltage connected to the inverting input provided by the junction of voltage divider resistors R42, R32 connected between voltage rail VR2 and ground. The non-inverting input is connected to the output of over-temperature protection comparator U3A. Comparator U2B is connected as a switch with no hysteresis and has its output connected to voltage rail VR1 through serially connected resistors R33 and R21. The junction of these resistors is connected to the base of a PNP transistor Q4 whose emitter is connected to voltage rail VR1 and whose collector is connected to ground through a resistor R43, sized to be of equivalent resistance to that of coil KA. Thus, whenever coil KA is de-energized the output of over-temperature protection comparator U3A is driven low which in turn lowers the voltage on the non-inverting input of comparator switch U2B causing its output to go high and turning on transistor Q4 thereby allowing current to flow through resistor R43 to provide an essentially constant load for the power supply. This avoids drastic change in the secondary voltage of the transformer.

Terminals X and Y are provided for testing purposes. When terminal X is connected to ground (C terminal) the time delay section 16 is nullified, a resistor is placed between the Y ad C terminals thereby shortening the time delay.

The following components were used in making a protection system in accordance with FIG. 1:

| S1 | PTC Thermistor | R1 3.92K |
|---|---|---|
| S2 | PTC Thermistor | R2 33.2K |
| S3 | PTC Thermistor | R3 60.4K |
| K | Siemens T7N5501-12 | R4 40.2K |
| BR1 | DF04M | R5 20K |
| C1 | 220 uF-63V | R6 34K |
| C2 | .01 uF | R7 80.6K |
| C3 | .01 uF | R8 20K |
| C4 | 0.22 uF | R9 2.87K |
| C5 | 100 uF | R10 22K |
| C9 | 1.0 uF | R11 4.87K |
| C10 | 0.1 uF | R12 10K |
| ZD1 | BZX84C5V1LTI Motorola 5.1V 5% | R14 22K |
| ZD2 | BZX84C5V1LTI Motorola 5.1V 5% | R15 412K |
| D1 | BAS16LT1 | R16 442K |
| D2 | BAS16LT1 | R17 178K |
| D3 | BAS16LT1 | R18 40.2K |
| D4 | BAS16LT1 | R19 130K |
| D5 | BAS16LT1 | R20 20.5K |
| D6 | 1N4007 | R21 6.8K |
| D7 | 1N4007 | R22 5.11K |
| D8 | 1N4007 | R23 8.06K |
| Q1 | BCP56T1 Motorola | R24 8.06K |
| Q2 | MPSA06 | R25 8.06K |
| Q3 | MPSA06 | R26 130K |
| Q4 | 2N4403 | R28 15K |
| Q5 | MPS406 | R29 200K |
| U1 | TL4311 Texas Instruments | R30 287K |
| U2A | LM2901NA | R31 200K |
| U2B | LM2901NA | R32 124K |
| U2C | LM2901NA | R33 27.4K |
| U2D | LM2901NA | R34 53.6K |
| U3A | LM2903MA | R35 1.82K |
| U3B | LM2903MA | R36 200K |
| | | R37 12.1K |
| | | R38 200K |
| | | R40 42.2K |
| | | R41 162K |
| | | R42 42.2K |
| | | R43 402K |
| | | R44 42.2K |
| | | R45 19.6K |
| | | R48 412K |

Figure 2:
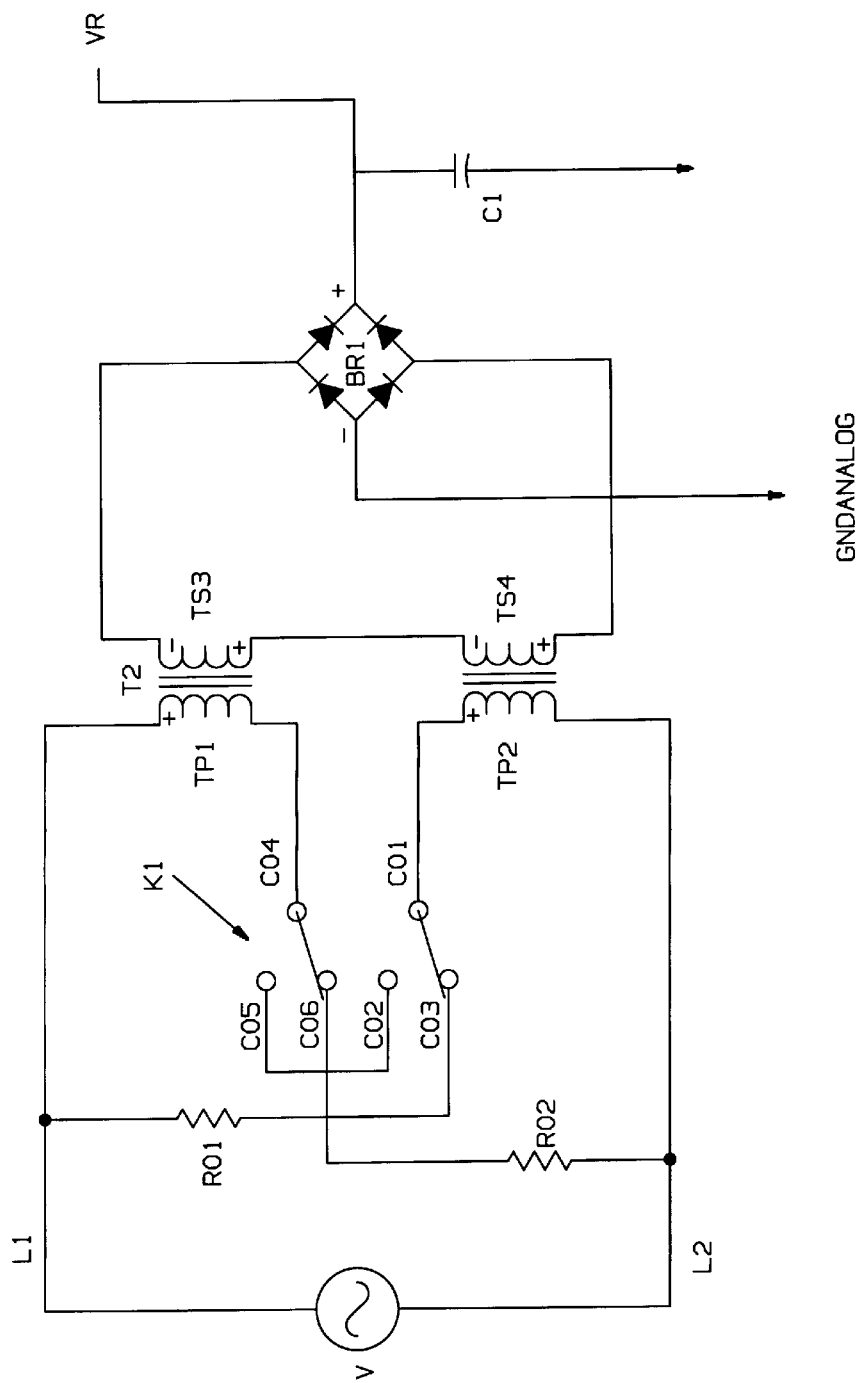
FIG. 2 is an electrical schematic of the power supply portion of a system made in accordance with a second embodiment of the invention.
Figure 3:
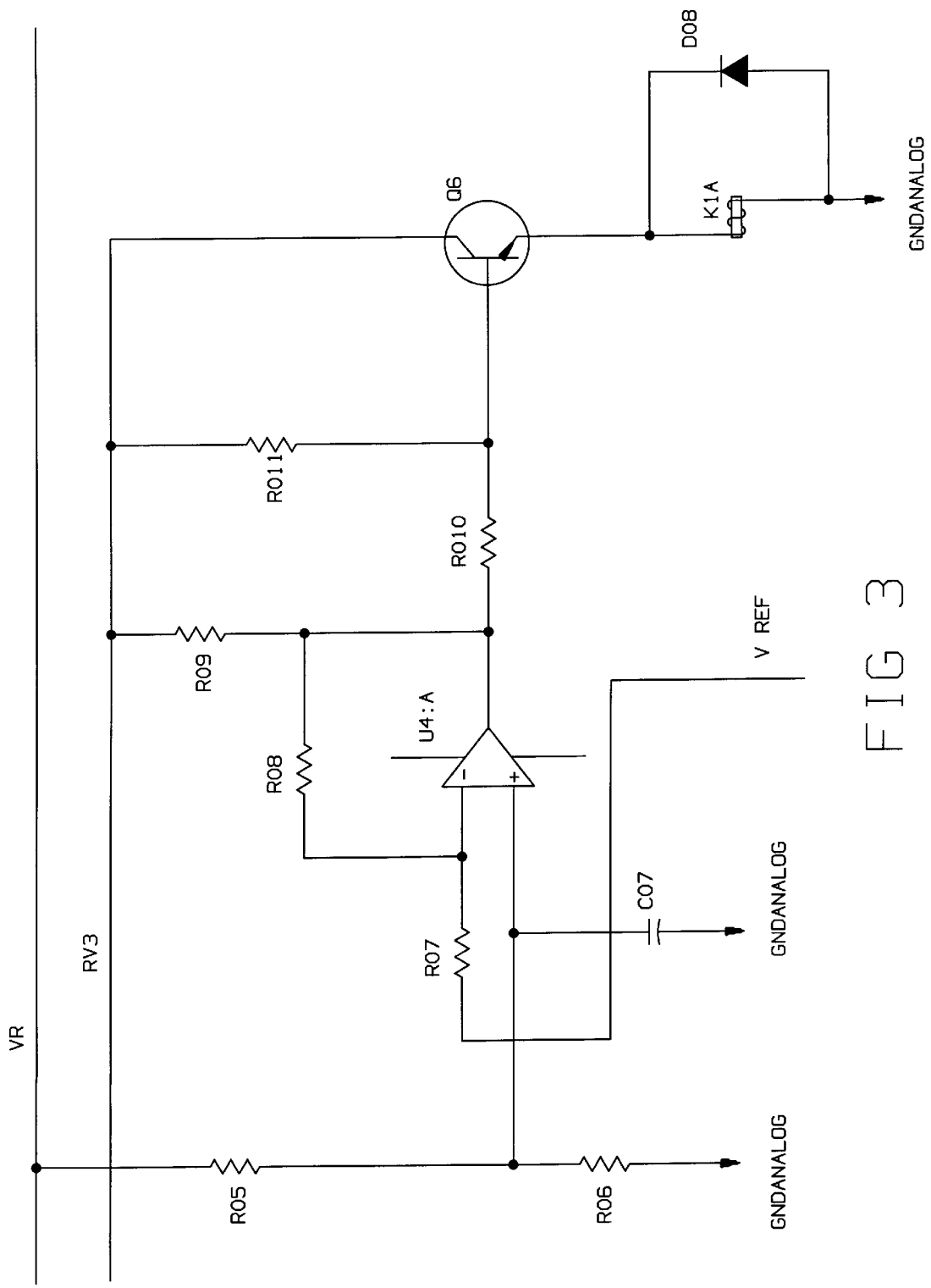
FIG. 3 is an electrical schematic of the output portion of the FIG. 2 embodiment.

With reference to FIGS. 2 and 3 an electronic motor protection system made in accordance with a second embodiment is shown. A double pole, double throw relay K1 is connected to the primary side of transformer T2. Relay K1 has common contact C04 movable between contacts C05 and C06 and common contact C01 movable between contacts C02 and C03. Contacts C02 and C05 are interconnected. Contact C06 is connected through resistor R02 to line L2, the negative end of primary winding TP2 and common contact C01. Contact C03 is connected through resistor R01 to line L1, the positive end of primary winding TP1 and common contact C04. Secondary windings TS3 and TS4 are serially connected across full wave diode bridge BR1. It should be noted that the secondary windings can be formed from a single coil, if desired. Capacitor C1 is connected between the output of bridge BR1 and ground to provide a ripple voltage line VR directly dependent upon line voltage. With reference to FIG. 3, the ripple voltage is fed into the non-inverting input of comparator U4A through the junction of voltage divider resistors R05, R06 connected to analog ground. A reference voltage is fed to the inverting input of comparator U4A through resistor R07. Comparator U4A is provided with a feedback resistor R08 connected between its inverting input and its output to provide hysteresis and a filter capacitor C07 is connected between its non-inverting input and analog ground. The output of comparator U4A is connected to rail voltage line RV3 through resistor R09 and to the base of a PNP transistor switch Q6 through resistor R010. Rail voltage line VR3 is connected to the collector of transistor Q6 and to its base through resistor R011. The emitter-collector circuit of transistor Q6 is connected to the coil K1A which controls the energization of the contacts of relay K1 of FIG. 2. Diode D08 is connected across the coil in the usual manner.

As shown in FIG. 2, coils TP1 and TP2 are arranged in parallel relation as an initial orientation so that with a 10:1 step down and with 120 volts on the primary, 12 volts appear on each of secondary windings TS3, TS4 which, when rectified by bridge BR1, provides a suitable rail voltage for controlling the protective circuitry. Following filter capacitor C1 the ripple voltage line VR is provided as in the FIG. 1 embodiment and a zener follower scheme, as in the FIG. 1 embodiment, or other simple regulation scheme, is used to provide a DC voltage to the logic circuitry. The ripple voltage is fed into comparator U4A through voltage divider R05, R06. Once line voltage increases to a selected level, e.g., 155 volts, the output of comparator U4A will be driven high turning on transistor Q6 thereby energizing coil K1A and switching the contacts of relay K1 so that contacts C04 and C05 will engage and C01 and C02 will engage thereby placing primary coils TP1 and TP2 in series effectively doubling the step down ratio so that for 240 volts the ripple voltage will be essentially in the same range whether line voltage is 120 or 240 volts. By providing hysteresis, the relay will not switch back to its parallel mode until a selected lower voltage, e.g., the equivalent of 145 volts, is detected, thereby avoiding relay chatter. Placement of relay in the secondary side of the transformer allows the use of a relatively small, low cost relay subjected to low voltage and current with excellent sensitivity. However, it will be realized that it is within the purview of the invention to place the comparative circuitry in the primary side of the transformer, if desired. Other features, such as over-temperature protection, time delay and low voltage cut-out for 120 volts can be provided in the same manner as in the FIG. 1 embodiment so that the description will not be repeated.

In view of the above, it will be seen that the electronic motor protection system made in accordance with the invention can be used with either 120 or 240 VAC using only two input terminals. The system of the first embodiment allows for efficient circuitry with two distinct DC voltage rails while the system of the second embodiment minimizes power dissipation in the transformer by placing the transformer's orientation control relay in the secondary side thereby allowing the use of a lower level of DC coil voltage and thus a smaller relay. The low voltage cut-out function requires no calibration during manufacture or installation. The adjustment circuit for relay drop-out protects against large changes in the load on the power supply transformer and makes voltage detection circuitry easier to implement. The transformer provides isolation and protects against transient voltage spikes. The several functions provide over-temperature protection, low voltage cut-out and time delay thereby protecting against motor chatter, overheating and burnout. The characteristic of the system of being able to be used with different voltage ratings allows the use of a common printed circuit board for all ratings throughout the industrial range thereby lowering the cost of the system by reason of enhanced efficiencies of large scale production and fewer parts to be maintained in inventory.

Variations and modifications of the invention will become readily apparent to those familiar with electronic motor protection systems. The invention should not be considered as being limited to the specific embodiments depicted, but rather as defined in the claims.

We claim:

1. A motor protection system comprising
   at least one electrically conductive resistive temperature responsive sensor having an output signal responsive to temperature,
   a relay coil,
   an over-temperature protection comparator circuit having first and second inputs and an output changeable between high and low states in response to signals received by the first and second inputs, the output connected to a switch for controlling energization and de-energization of electrical current to the relay coil, the output signal of the at least one sensor coupled to the first input of the comparator circuit so that upon a selected change in temperature of the at least one sensor, the output signal will cause the output of the comparator circuit to change states to de-energize the relay coil,
   a power supply for the system compatible with both 120 VAC and 240 VAC input voltage including a transformer, the transformer having secondary windings coupled to a full wave rectifier and the full wave rectifier having a DC output, a filter capacitor connected between the DC output and analog ground to provide a ripple voltage rail which is directly related to input VAC voltage, a first voltage regulator connected to the ripple voltage rail for providing a first regulated voltage rail and a second voltage regulator connected to the ripple voltage rail for providing a second, independent, regulated voltage rail, the first regulated voltage rail connected to the relay coil, a voltage divider comprising resistors having a junction connected to the second voltage rail, the junction connected to the second input of the comparator circuit to provide a reference voltage and the at least one temperature responsive sensor being electrically coupled to one of the first and second regulated voltage rails.

2. A motor protection system according to claim 1 in which the first voltage regulator comprises a zener follower circuit.

3. A motor protection system according to claim 1 in which the second voltage regulator comprises a high precision series regulator circuit.

4. A motor protection system according to claim 1 further comprising
   a first low voltage cut-out comparator circuit for detecting the occurrence of a first selected low line voltage and to de-energize the relay coil upon such occurrence including first and second inputs and an output changeable between high and low states in response to signals received by the first and second inputs, the output of the first low voltage cut-out comparator connected to the output of the over-temperature protection comparator circuitry, a first input of the first low voltage cut-out comparator coupled to the ripple voltage rail for detecting the line voltage and the second input of the first low voltage cut-out comparator coupled to the second voltage rail to provide a reference voltage, and
   a second low voltage cut-out comparator circuit for detecting the occurrence of a second selected low line voltage and to de-energize the relay coil upon such occurrence including first and second inputs and an output changeable between high and low states in response to signals received by the first and second inputs, the output of the second low voltage cut-out comparator connected to the output of the over-temperature protection comparator circuitry, the first input of the second low voltage cut-out comparator coupled to the ripple voltage rail for detecting the line voltage and the second input of the second low voltage cut-out comparator coupled to the second voltage rail to provide a reference voltage.

5. A motor protection system according to claim 4 in which the first selected low line voltage is approximately 70% of 120 VAC and the second selected low line voltage is approximately 70% of 240 VAC.

6. A motor protection system according to claim 5 further comprising a low voltage cut-out selector comparator circuit for providing a dead-band voltage range between the 120 and 240 VAC to prevent excessive voltage from being applied to 120 volt motors including first and second inputs and an output changeable between high and low states in response to signals received by the first and second inputs, the output of the low voltage cut-out selector comparator circuit connected to second input of the second low voltage cut-out comparator circuit, the first input of the low voltage cut-out selector circuit coupled to the ripple voltage line and the second input of the low voltage cut-out selector comparator circuit coupled to the second voltage rail to provide a reference voltage, the output of the low voltage cut-out selector comparator circuit switching states upon detection of the equivalent of approximately 150 volts.

7. A motor protection system according to claim 1 further comprising an adjustment circuit having an input and an output, a second switch controlled by the output and a resistive load serially connected to the switch equivalent to the relay coil, the output of the over-temperature protection comparator circuit connected to the input of the adjustment circuit so that whenever the relay coil is de-energized the output of the adjustment circuit causes the second switch to energize the resistive load.

8. A motor protection system according to claim 7 in which the adjustment circuit comprises an adjustment comparator circuit having first and second inputs and the output, the output of the over-temperature protection comparator circuit connected to the first input of the adjustment comparator circuit, the second input of the adjustment comparator circuit coupled to the second voltage rail and the second switch comprising a PNP transistor having a collector-emitter circuit connected to the first voltage rail and the resistive load.

9. A motor protection system according to claim 1 in which the switch connected to the output of the over-temperature protection comparator circuit comprises an NPN transistor having a collector-emitter circuit connected to the relay coil.

10. A motor protection system comprising at least one temperature responsive sensor having an output signal responsive to temperature a relay coil, an over-temperature protection comparator circuit having first and second inputs and an output changeable between high and low states in response to signals received by the first and second inputs, the output connected to a switch for controlling energization and de-energization of electrical current to the relay coil, the output signal of the at least one sensor coupled to the first input of the comparator circuit so that upon a selected change in temperature of the at least one sensor the output signal will cause the output of the comparator circuit to change states to de-energize the coil, a power supply comprising first and second VAC lines and a transformer having first and second primary coils having first and second opposite ends and a double pole, double throw relay having a second relay coil and a first common contact movable upon energization of the coil of the relay between first and second stationary contacts and a second common contact movable upon energization of the coil of the relay between third and fourth stationary contacts, one opposite end of each primary coil connected to respective VAC lines, the other opposite end of each primary coil connected to a respective common contact, the second and fourth stationary contacts being interconnected to one another, the first and third stationary contacts connected to respective VAC lines, the transformer having a secondary winding coupled to a full wave rectifier and the full wave rectifier having a DC output, a filter capacitor connected between the DC output and analog ground to provide a ripple voltage rail which is directly related to input VAC voltage, a voltage regulator connected to the ripple voltage rail for providing a regulated voltage rail, a detection circuit having an input coupled to the ripple voltage rail and an output, a switch, the second relay coil connected to the regulated voltage rail through the switch, the switch connected to and controlled by the output of the detection circuit, the detection circuit, upon detecting a voltage on the ripple voltage rail of a selected voltage exceeding the equivalent of 120 VAC and less than the equivalent of 240 VAC, outputs a signal to the switch to energize the second relay coil and move the first and second common contacts out of engagement with respective first and third stationary contacts in which the first and second primary transformer coils are in parallel circuit configuration to a series circuit configuration in which the first and second common contacts are in engagement with respective second and fourth stationary contacts.

11. A motor protection system comprising a temperature responsive sensor for detecting the temperature of a winding of a motor to be protected, the sensor having an output signal which varies with temperature, an output circuit for receiving the output signal and for de-energizing the motor upon a selected increase in temperature of the sensor, a power supply comprising first and second VAC lines, a transformer having a primary side and a secondary side, first and second primary windings in the primary side each having a first end connected to a respective VAC line and a secondary winding, a double pole, double throw switch having stationary contacts, first and second movable common contacts and a coil, energization and de-energization of the coil controlling the pole position of the movable contacts, the primary windings each having a second end connected to a respective common contact, the common contacts connected in one pole position to place the primary windings in parallel circuit configuration for 120 VAC operation and in a second pole position to place the primary windings in series circuit configuration for 240 VAC operation, the coil being electrically connected in the secondary side of the transformer, the secondary side of the transformer having a detection circuit for detecting secondary voltage corresponding to VAC voltage and having an output for energization and de-energization the coil upon detection of a selected voltage to move the contacts between the 120 VAC and 240 operations.

* * * * *